United States Patent
Hachimura

(10) Patent No.: US 9,773,143 B2
(45) Date of Patent: Sep. 26, 2017

(54) IMAGE PROCESSING APPARATUS, IMAGE PROCESSING METHOD, AND IMAGE PROCESSING SYSTEM

(71) Applicant: CANON KABUSHIKI KAISHA, Tokyo (JP)

(72) Inventor: Futoshi Hachimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/086,848

(22) Filed: Mar. 31, 2016

(65) Prior Publication Data
US 2016/0292484 A1    Oct. 6, 2016

(30) Foreign Application Priority Data
Apr. 3, 2015 (JP) .................... 2015-076526

(51) Int. Cl.
G06K 7/00 (2006.01)
G06K 7/14 (2006.01)
H04N 5/232 (2006.01)
G06K 19/06 (2006.01)
H04N 1/00 (2006.01)

(52) U.S. Cl.
CPC ......... G06K 7/1443 (2013.01); G06K 7/1417 (2013.01); G06K 19/06037 (2013.01); H04N 1/00 (2013.01); H04N 5/23206 (2013.01); H04N 5/23296 (2013.01); G06K 2019/06225 (2013.01)

(58) Field of Classification Search
USPC ................................. 235/435; 348/222.1
See application file for complete search history.

(56) References Cited

U.S. PATENT DOCUMENTS

2010/0177204 A1* 7/2010 Tsuchiya ............... H04N 5/232
348/222.1

FOREIGN PATENT DOCUMENTS

JP    2005-286439 A    10/2005

* cited by examiner

*Primary Examiner* — Jamara Franklin
(74) *Attorney, Agent, or Firm* — Canon U.S.A. Inc., IP Division

(57) ABSTRACT

An image processing apparatus includes an acquisition unit that acquires setting information acquired from a captured image, a setting unit that performs, based on the acquired setting information, setting regarding image analysis processing to be performed on a captured image obtained by capturing an image of a predetermined monitoring target range.

17 Claims, 9 Drawing Sheets

IMAGE PROCESSING APPARATUS, IMAGE PROCESSING METHOD, AND IMAGE PROCESSING SYSTEM

BACKGROUND

Field

Aspects of the present invention generally relate to an image processing apparatus, an image processing method, and an image processing system for performing analysis processing on an image.

Description of the Related Art

Conventionally, barcodes are used as a method for transferring identification information of products and goods. As one type of the barcodes, two-dimensional barcodes, which are able to deal with a larger amount of information than one-dimensional barcodes, are in widespread use. Furthermore, in recent years, color codes with multiple colors, which represent information with an arrangement of colors, have been attracting attentions. In this way, two-dimensional or color codes enable embedding a much more amount of information in barcodes.

Japanese Patent Application Laid-Open No. 2005-286439 discusses a digital still camera that processes image data recorded on a recording medium using setting information recorded on a barcode. The digital still camera captures an image of a barcode on which wireless local area network (LAN) setting information used for transmission using a wireless LAN was recorded, and detects the wireless LAN setting information from the captured image of the barcode. Then, the digital still camera wirelessly transmits image data recorded on a recording medium using the detected wireless LAN setting information. The wireless LAN setting information as used herein includes access point information and transmission destination information.

In the technique discussed in Japanese Patent Application Laid-Open No. 2005-286439 mentioned above, the digital still camera is able to wirelessly transmit image data using setting information embedded in a barcode, but is not able to perform setting regarding image analysis processing for analyzing image data.

For example, monitoring cameras are installed at stores, station premises, roads, and other places. At the time of installing a monitoring camera, in order to implement an image analysis function adapted for purposes, such as face recognition of objects, motion detection, and head count, it is necessary to perform setting regarding image analysis processing. The setting regarding image analysis processing includes, for example, selection of an image analysis function to be enabled and setting of parameters required for performing image analysis processing. The parameters include, for example, parameters related to positions, such as a line used for detecting passage of a moving object, a region used for detecting intrusion of a moving object, and a monitoring target range. Such parameters are required to be set by users while viewing a camera video image displayed on a setting screen on a management terminal.

SUMMARY

According to an aspect of the present invention, an image processing apparatus includes an acquisition unit configured to acquire setting information regarding setting of image analysis processing from a captured image and a setting unit configured to perform, based on the setting information acquired by the acquisition unit, setting regarding image analysis processing to be performed on a captured image of a monitoring target range.

Further features of aspects of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Furthermore, exemplary embodiments described below are merely examples for implementing aspects of the present invention, and can be modified or altered depending on the configuration of an apparatus to which aspects of the present invention are applied and various other conditions, so that the aspects of the present invention should not be construed to be limited to the following exemplary embodiments.

Figure 1:
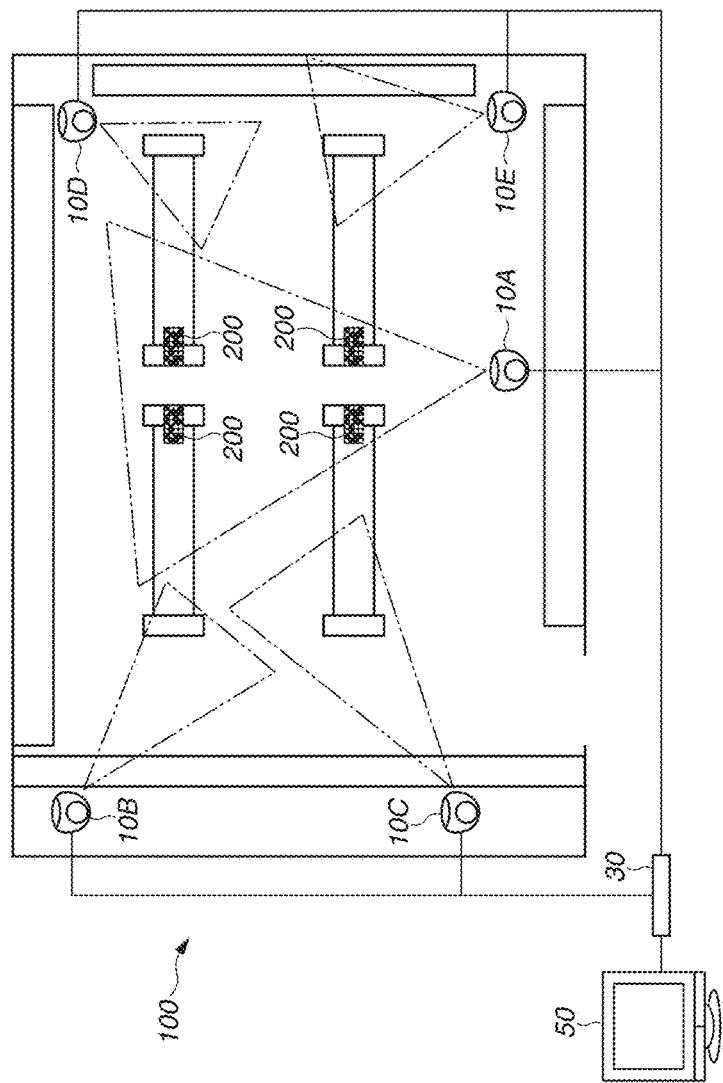
FIG. 1 is a schematic configuration diagram illustrating an example of an image processing system.

FIG. 1 is a schematic configuration diagram illustrating an example of an image processing system according to an exemplary embodiment. The present exemplary embodiment is directed to an example in which the image processing system is applied to a network camera system that performs monitoring of the inside of a store.

A network camera system 100 includes a plurality of network cameras (hereinafter simply referred to as "cameras") 10A to 10E. Furthermore, although, in FIG. 1, five cameras are installed, one or more cameras can be installed, so that the number of cameras is not limited to that illustrated in FIG. 1. The cameras 10A to 10E are connected to a management terminal 50 via a hub 30. Each of the cameras 10A to 10E is connected to the hub 30, which is connected to the management terminal 50, by a local area network (LAN), which is a network line. Furthermore, the network line is not limited to a LAN, but can be the Internet or a wide area network (WAN). Moreover, the physical connection configuration to the LAN can be a wired one or wireless one.

The cameras 10A to 10E according to the present exemplary embodiment each operate as an image processing apparatus. Moreover, the cameras 10A to 10E have respective similar configurations. Therefore, in the following description, the cameras 10A to 10E are collectively referred to as a "camera 10".

The camera 10 is a pan-tilt-zoom (PTZ) camera having a panning mechanism, a tilting mechanism, and a zoom mechanism, and is able to adjust an image capturing range in response to control over a panning position, a tilting position, and a zoom position. Furthermore, the camera 10 has an image analysis function (recognition function) to recognize a particular object (for example, a person) that is determined to meet a predetermined condition by analyzing an image obtained by image capturing. The image analysis function includes, for example, a moving object detection function, which detects a moving object from among subjects, a human body detection function, which detects a human body from among subjects, and a face detection function, which detects the face (orientation, size, age, and other factors) of a person. Moreover, the image analysis function further includes a passage detection function, which detects a particular object having passed a predetermined position, and an intrusion detection function, which detects a particular object having intruded into a predetermined region. The camera 10 is able to perform image analysis processing for implementing the above-mentioned image analysis function based on a captured image and to transmit a result of the image analysis processing to the management terminal 50.

The camera 10 is able to capture an image of at least one image code 200 installed at an image capturing location (in the present exemplary embodiment, the inside of a store) and to detect, from the captured image, setting information regarding the above-mentioned image analysis processing embedded in the image code 200. Moreover, in a case where the user has started the camera 10 in a setting mode, the camera 10 is also able to perform camera setting processing for performing setting regarding image analysis processing. The camera setting processing is processing for performing selection (starting) of an image analysis function to be enabled and setting of parameters required for performing image analysis processing based on the setting information recorded in the image code 200. The camera setting processing is described below in detail.

Figure 2:
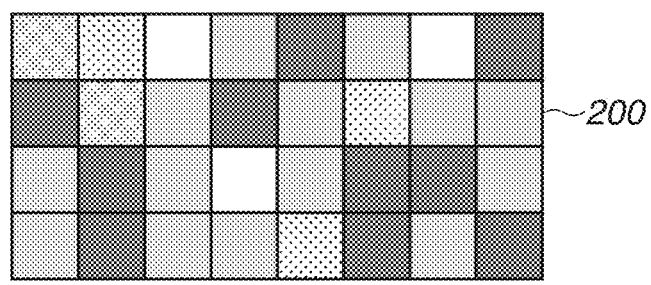
FIG. 2 illustrates an example of an image code (identification information).

The image code 200 as used herein includes a one-dimensional barcode, a two-dimensional barcode, and a color code with multiple colors (including one-dimensional and two-dimensional ones) illustrated in FIG. 2, which is augmented from two, black and white, colors of barcodes. As one type of the color code, for example, Chameleon Code (a registered trademark in Japan) can be used. The image code 200 has the above-mentioned setting information embedded therein. The setting information includes function setting information for setting an image analysis function that is to be enabled and parameter setting information for setting parameters (including image capturing parameters) that are required for execution of image analysis processing. In other words, the image code 200 in the present exemplary embodiment can be said to be identification information for identifying setting information regarding setting of image analysis processing.

The image code 200 can be a print printed on a paper medium, or can be a display displayed on an electronic display medium, such as a tablet, a light-emitting diode (LED) display, and an electronic paper. The image code 200 is installed in a position associated with a monitoring target. For example, the image code 200 is installed by being posted or attached to a shelf or the wall of a passage that exists within a monitoring target range at the image capturing location. The camera 10 is able to detect an installation position (spatial position: width, depth, and height) of the image code 200 from a captured image obtained by capturing an image of the image code 200 and an image capturing angle at which to obtain the captured image. The detected installation position information can be used for setting regarding image analysis processing. In other words, directly installing the image code 200 at the image capturing location enables specifying the position on a real space used for the setting. Moreover, in a case where the image code 200 is a print, the size thereof can be easily changed. Therefore, it becomes possible to specify the zoom magnification of the camera 10, which captures an image of the image code 200.

The management terminal 50 is composed of, for example, a personal computer (PC), and is operable by the user (for example, an observer). The management terminal 50 has a display control function to reproduce image frames distributed from the cameras 10A to 10E and to display a result of image analysis processing.

Next, a configuration of the camera 10 is specifically described.

Figure 3:
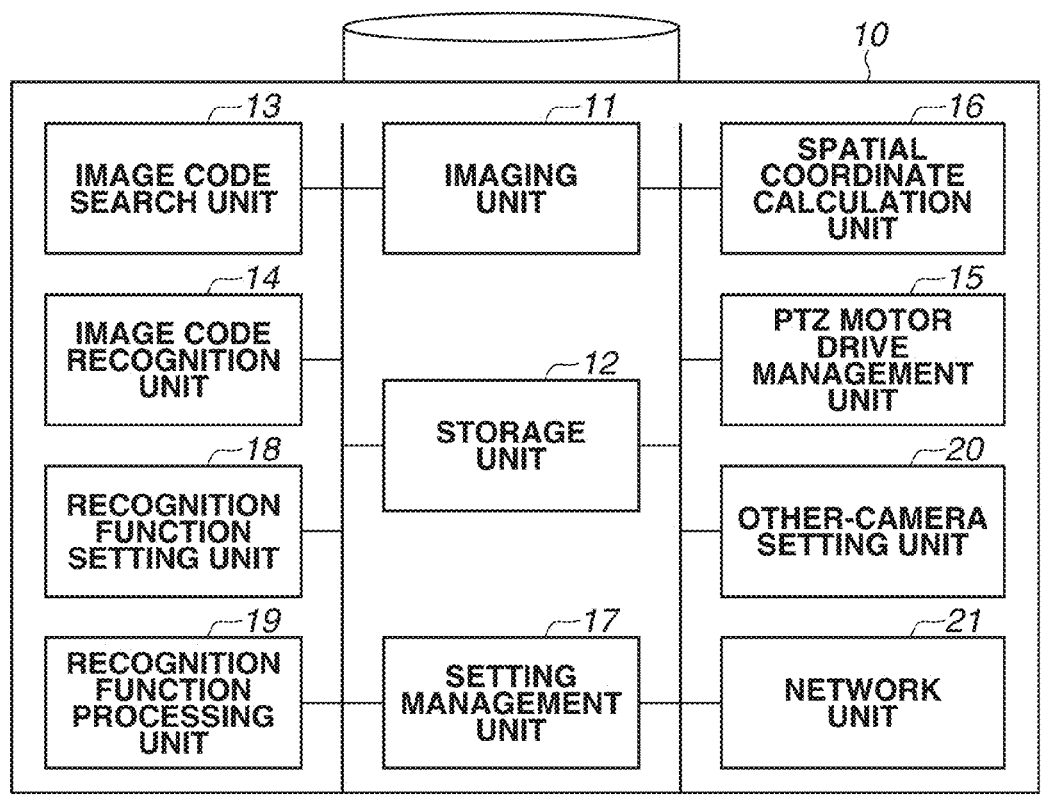
FIG. 3 is a block diagram illustrating a configuration of a camera.

As illustrated in FIG. 3, the camera 10 includes an imaging unit 11, a storage unit 12, an image code search unit 13, an image code recognition unit 14, a PTZ motor drive management unit 15, a spatial coordinate calculation unit 16, and a setting management unit 17. Moreover, the camera 10 further includes a recognition function setting unit 18, a recognition function processing unit 19, an other-camera setting unit 20, and a network unit 21.

The imaging unit 11, which is configured to capture an image of a subject, includes an image sensor, such as a complementary metal-oxide semiconductor (CMOS) sensor or a charge-coupled device (CCD) sensor. The storage unit 12 stores image frames, which are obtained by the imaging unit 11 performing image capturing, and moving image data, which is obtained by compressing the image frames. The image code search unit 13 reads out image frames stored in the storage unit 12 and searches for a specified image code from the image frames. The image code recognition unit 14 recognizes setting information embedded in the image code found by the image code search unit 13.

The PTZ motor drive management unit 15 sets the direction (the panning position and the tilting position) and the angle of view (the zoom position) of the camera 10. The PTZ motor drive management unit 15 controls drive motors for panning, tilting, and zoom based on numerical values respectively representing the panning position, the tilting position, and the zoom position. Furthermore, numerical values respectively representing the panning position, the tilting position, and the zoom position can be read out from the PTZ motor drive management unit 15. The spatial coordinate calculation unit 16 reads out numerical values respectively representing the panning position, the tilting position, and the zoom position from the PTZ motor drive management unit 15 and acquires the orientation (the direction and the angle of view) of the camera 10 based on the numerical values. Furthermore, the spatial coordinate calculation unit 16 calculates the spatial position (world coordinates) of the image code 200 based on the acquired orientation of the camera 10 and the position of the image code 200 in the image frames.

The setting management unit 17 performs management of setting information and management of the setting mode. In a case where the camera 10 is started in the setting mode in response to an instruction from the user, the setting management unit 17 brings camera setting processing into an executable state. Furthermore, at this time, the setting management unit 17 acquires the setting information recognized by the image code recognition unit 14 from the image code 200 and the spatial position information of the image code 200 calculated by the spatial coordinate calculation unit 16.

The setting management unit 17 performs setting of parameters used for image analysis processing based on the acquired setting information and spatial position information.

For example, in the case of detecting about how many years old a person who has picked up a product is, it is necessary to start an intrusion detection function, which detects a person having intruded into a predetermined region including a shelf on which the product is put on display, and a face detection function, which detects the angle and size of the face and the age of a person who looks at the product. In a case where the setting information contains parameter setting information for setting an intrusion detection region, the setting management unit 17 determines the intrusion detection region as the above-mentioned parameters based on the parameter setting information.

Furthermore, for example, in the case of counting the number of persons present inside the store, it is necessary to start a passage detection function, which detects a person having passed a predetermined line. In a case where the setting information contains parameter setting information for setting a passage detection line, the setting management unit 17 determines the passage detection line as the above-mentioned parameters based on the parameter setting information.

Moreover, in a case where the setting information contains parameter setting information for setting a monitoring target range used for the camera 10, the setting management unit 17 determines the monitoring target range and an image capturing condition as the above-mentioned parameters based on the parameter setting information. The image capturing condition as used herein includes, for example, the orientation of the camera 10 for capturing an image of the monitoring target range.

As mentioned in the foregoing, the parameter setting information is information for setting parameters regarding the position on a real space, such as an intrusion detection region, a passage detection line, and an image capturing range.

The recognition function setting unit 18 selects an image analysis function (recognition function), which is to be started, based on function setting information included in the setting information recognized by the image code recognition unit 14 from the image code 200, and performs setting for starting the image analysis function. The recognition function processing unit 19 performs image analysis processing for implementing the image analysis function (recognition function) set by the recognition function setting unit 18.

The other-camera setting unit 20 transmits a setting command and other commands to the other cameras via the network unit 21. The network unit 21 relays the transfer of a setting command or image data between the other cameras, the management terminal 50, and video management software (VMS) via a network.

The respective elements illustrated in FIG. 3 can constitute the camera 10 as individual hardware components. In this case, each element illustrated in FIG. 3 operates as an individual hardware component based on the control of a central processing unit (CPU) 101 illustrated in FIG. 4. However, a part of or the whole of the function of each element may be executed by the CPU 101 illustrated in FIG. 4.

Figure 4:
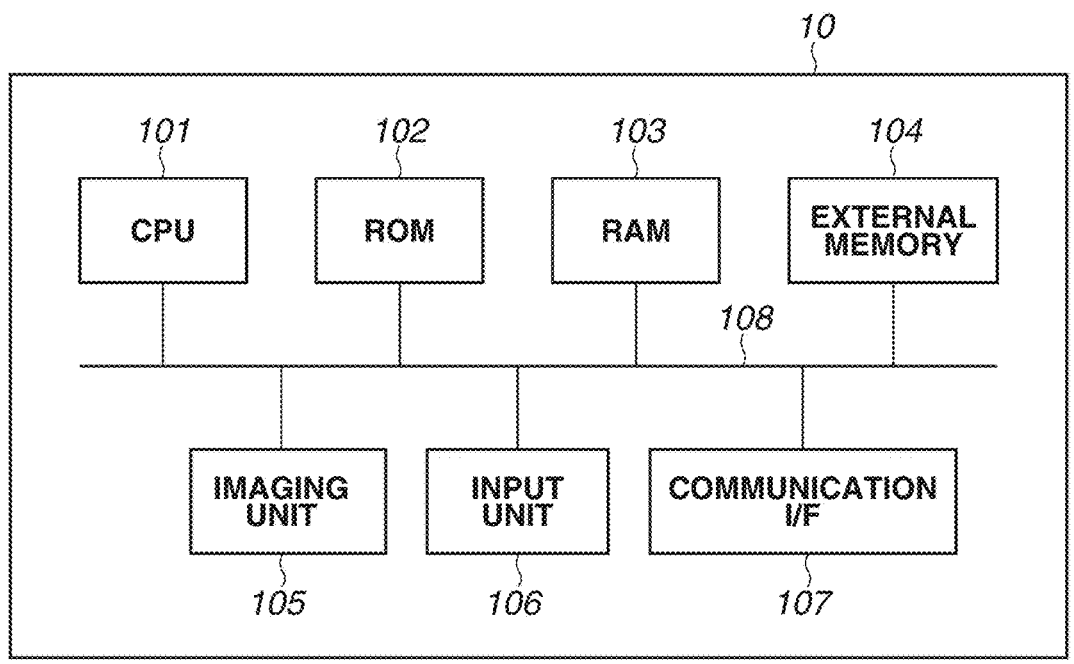
FIG. 4 illustrates an example of a hardware configuration of the camera.

As illustrated in FIG. 4, the camera 10 includes the CPU 101, a read-only memory (ROM) 102, a random access memory (RAM) 103, an external memory 104, an imaging unit 105, an input unit 106, a network unit (communication interface (I/F)) 107, and a system bus 108. The CPU 101 comprehensively controls an operation of the camera 10, thus controlling the constituent components 102 to 107 via the system bus 108. The ROM 102 is a non-volatile memory that stores control programs, which is required for the CPU 101 to perform processing, and other data. Furthermore, the control programs may be stored in the external memory 104 or a removable storage medium (not illustrated). The RAM 103 functions as a main memory or a work area for the CPU 101. Thus, the CPU 101 loads the required control programs from the ROM 102 onto the RAM 103 during execution of processing and executes the control programs to implement various functional operations.

The external memory 104 stores, for example, various pieces of data and various pieces of information required for the CPU 101 to perform processing using the programs. Furthermore, the external memory 104 also stores, for example, various pieces of data and various pieces of information acquired by the CPU 101 performing processing using the programs. The imaging unit 105 corresponds to the imaging unit 11 illustrated in FIG. 3. The input portion 106 is composed of a sensor input terminal and other components, and an instruction to the camera 10 is input by the input unit 106. The network unit 107 corresponds to the network unit 21 illustrated in FIG. 3. A part of or the whole of the function of each element of the camera 10 illustrated in FIG. 3 may be implemented by the CPU 101 executing the programs stored in the ROM 102 or the external memory 104.

Furthermore, although, in the present exemplary embodiment, an example is described in which the camera 10 operates as an image processing apparatus, the management terminal 50 may operate as an image processing apparatus, or a general PC or another apparatus may operate as an image processing apparatus.

Figure 5:
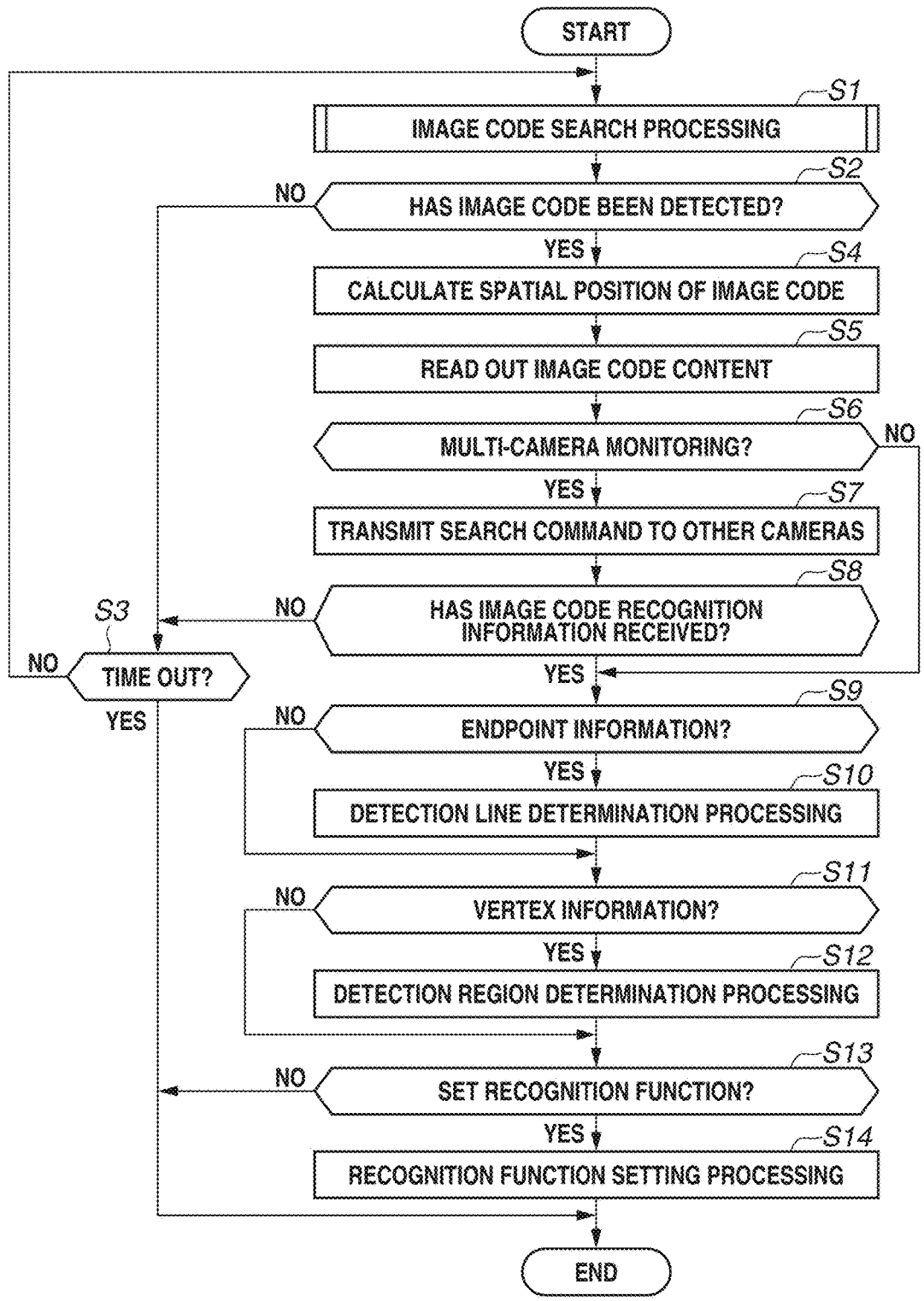
FIG. 5 is a flowchart illustrating an operation of the camera.

FIG. 5 is a flowchart illustrating an operation of the camera 10. Furthermore, in the present exemplary embodiment, an example is mainly described in which the processing illustrated in FIG. 5 is performed by each element illustrated in FIG. 3 operating as an individual hardware component. However, a part of or the whole of the function of each element illustrated in FIG. 3 may be implemented by the CPU 101 of the camera 10. The same is also applied to the other flowcharts in the present exemplary embodiment. The processing illustrated in FIG. 5 is started, for example, when the camera 10 is started in the setting mode. However, the timing of starting of the processing illustrated in FIG. 5 is not limited to the above-mentioned timing.

Figure 6:
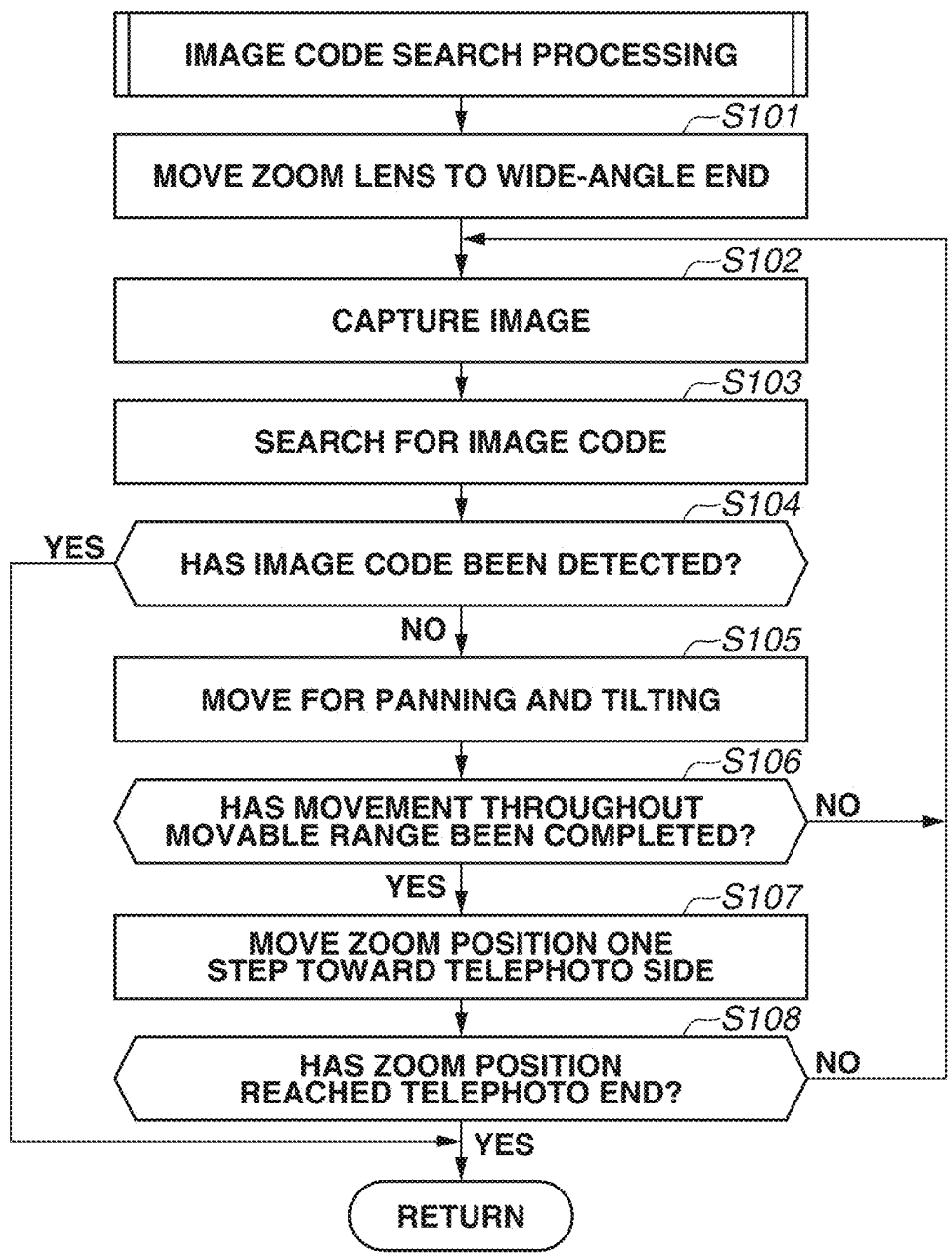
FIG. 6 is a flowchart illustrating image code search processing.

In step S1, the image code search unit 13 performs image code search processing. The image code search processing is processing for causing the imaging unit 11 to capture an image of a predetermined search target range and searching for an image code from the captured image. In the present exemplary embodiment, the image code search unit 13 sets an image capturable range of the camera 10 as the search target range and searches for an image code while controlling the orientation of the camera 10 using a panning mechanism, a tilting mechanism, and a zoom mechanism. In step S1, processing illustrated in FIG. 6 is performed.

First, in step S101, the image code search unit 13 moves a zoom lens of the camera 10 to the wide-angle end. Then, in step S102, the image code search unit 13 controls the imaging unit 11 to acquire a captured image frame. In step S103, the image code search unit 13 searches whether there is an image code in the image frame captured by the imaging unit 11.

In step S104, the image code search unit 13 determines whether an image code has been detected from the image frame. If the image code search unit 13 determines that any image code has not been detected (NO in step S104), the processing proceeds to step S105. If the image code search unit 13 determines that an image code has been detected (YES in step S104), the processing returns to the flow illustrated in FIG. 5.

In step S105, the image code search unit 13 moves the panning position and the tilting position one step within the movable range with the zoom position fixed. In the present exemplary embodiment, the above-mentioned unit of movement is determined according to the size of the smallest image code. In step S106, the image code search unit 13 determines whether the panning position and the tilting position have reached the positions where the movement throughout the movable range for panning and tilting has been completed. If the image code search unit 13 determines that the movement throughout the movable range for panning and tilting has not yet been completed (NO in step S106), the processing returns to step S102. If the image code search unit 13 determines that the movement throughout the movable range for panning and tilting has been completed (YES in step S106), the processing proceeds to step S107.

In step S107, the image code search unit 13 moves the zoom position one step toward the telephoto side, and the processing then proceeds to step S108. In step S108, the image code search unit 13 determines whether the zoom position has reached the telephoto end. If the image code search unit 13 determines that the zoom position has not yet reached the telephoto end (NO in step S108), the processing returns to step S102. If the image code search unit 13 determines that the zoom position has reached the telephoto end (YES in step S108), the processing returns to the flow illustrated in FIG. 5.

In step S2 illustrated in FIG. 5, the CPU 101 determines whether an image code has been detected in the image code search processing performed in step S1. If the CPU 101 determines that no image code has been detected (NO in step S2), the processing proceeds to step S3. If the CPU 101 determines that an image code has been detected (YES in step S2), the processing proceeds to step S4. In step S3, the CPU 101 determines whether the image code search operation has timed out. If the CPU 101 determines that the image code search operation has not yet timed out (NO in step S3), the processing returns to step S1, in which the CPU 101 re-performs the image code search processing. On the other hand, if the CPU 101 determines that the image code search operation has timed out (YES in step S3), the processing directly ends.

In step S4, the spatial coordinate calculation unit calculates the position on a real space of the detected image code. First, the PTZ motor drive management unit 15 controls the orientation of the camera 10 in such a manner that the image code is located at the center of the image frame. Then, the spatial coordinate calculation unit 16 reads out the respective numeric values of the panning position, the tilting position, and the zoom position of the camera 10, thus acquiring orientation information about the camera 10. Then, the spatial coordinate calculation unit 16 calculates the position of the image code based on the acquired orientation information about the camera 10. The position of the image code, which is calculated here, includes both a position in the image frame (camera coordinates) and a spatial position (world coordinates). The spatial position (world coordinates) can be derived using, for example, a ray intersection method.

In step S5, the image code recognition unit 14 reads out setting information embedded in the detected image code, and the processing then proceeds to step S6.

In step S6, the setting management unit 17 checks function setting information included in the setting information in the image code. Furthermore, the setting management unit 17 determines whether the function setting information is information indicating starting a multi-camera monitoring function, which monitors a monitoring target range with a plurality of cameras. If the setting management unit 17 determines that the function setting information is information indicating starting the multi-camera monitoring function (YES in step S6), the processing proceeds to step S7. If the setting management unit 17 determines that the function setting information is not information indicating starting the multi-camera monitoring function (NO in step S6), the processing proceeds to step S9.

In step S7, the other-camera setting unit 20 transmits, to the other cameras via the network unit 21, a search command to cause the other cameras to search for the detected image code. The search command includes the information indicating the spatial position of the image code detected by the camera itself and the setting information embedded in the detected image code. A camera that has received the search command searches whether the image code exists at the spatial position specified by the search command. Then, when having detected (recognized) the image code, the camera transmits image code recognition information to the camera that transmitted the search command. Processing performed by the camera that has received the search command is described below.

In step S8, the setting management unit 17 determines whether the image code recognition information, which has been transmitted by the other camera, has been received via the network unit 21. If the setting management unit 17 determines that the image code recognition information has been received (YES in step S8), the processing proceeds to step S9. If the setting management unit 17 determines that the image code recognition information has not been received (NO in step S8), the processing proceeds to step S3.

In step S9, the setting management unit 17 checks parameter setting information included in the setting information in the image code. Furthermore, the setting management unit 17 determines whether the parameter setting information is information regarding endpoints of a virtual line segment that is set on the real space (endpoint information). If the setting management unit 17 determines that the parameter setting information is the endpoint information (YES in step S9), the processing proceeds to step S10. If the setting management unit 17 determines that the parameter setting information is not the endpoint information (NO in step S9), the processing proceeds to step S11. In step S10, the setting management unit 17 determines, based on the endpoint information, a virtual line segment (a detection line) as a parameter used for image analysis processing. At this time, the setting management unit 17 sets the spatial position of the image code as endpoint positions of the virtual line segment. Then, the setting management unit 17 determines, as a detection line, a line segment connecting two endpoints.

In step S11, the setting management unit 17 determines whether the parameter setting information is information regarding vertices of a virtual closed region that is set on the real space (vertex information). Then, if the setting management unit 17 determines that the parameter setting information is the vertex information (YES in step S11), the processing proceeds to step S12. If the setting management unit 17 determines that the parameter setting information is not the vertex information (NO in step S11), the processing proceeds to step S13. In step S12, the setting management unit 17 determines, based on the vertex information, a virtual closed region (a detection region) as a parameter used for image analysis processing. At this time, the setting management unit 17 sets the spatial position of the image code as vertex positions of the virtual closed region. Then, the setting management unit 17 determines, as a detection region, a closed region connecting a plurality of vertices.

In step S13, the setting management unit 17 determines whether function setting information is included in the setting information in the image code. Then, if the setting management unit 17 determines that the function setting information is included in the setting information (YES in step S13), the setting management unit 17 determines to set an image analysis function (a recognition function), and requests the recognition function setting unit 18 to set a recognition function. Then, the processing proceeds to step S14. On the other hand, if the setting management unit 17 determines that the function setting information is not included in the setting information (NO in step S13), the processing directly ends.

In step S14, the recognition function setting unit 18 performs setting of the image analysis function (the recognition function), the setting of which has been requested. For example, in a case where the setting of a passage detection function has been requested, the recognition function setting unit 18 performs setting of a passage detection function in which the detection line determined in step S10 is set as a passage detection line. Furthermore, for example, in a case where the setting of an intrusion detection function has been requested, the recognition function setting unit 18 performs setting of an intrusion detection function in which the detection region determined in step S12 is set as an intrusion detection line. Moreover, for example, in a case where the setting of a status analysis function has been requested, the recognition function setting unit 18 sets the detection region determined in step S12 as a monitoring target range (an image capturing range of the camera 10). The recognition function setting unit 18 can also set, as a monitoring target range, a region including the spatial position of the image code calculated in step S4. Then, the recognition function setting unit 18 adjusts the angle of the camera 10 in such a way as to enable the camera 10 to capture an image of the set monitoring target range, thus bringing the image analysis processing into an executable state. Moreover, the recognition function setting unit 18 instructs the recognition function processing unit 19 to start the image analysis processing.

Figure 7:
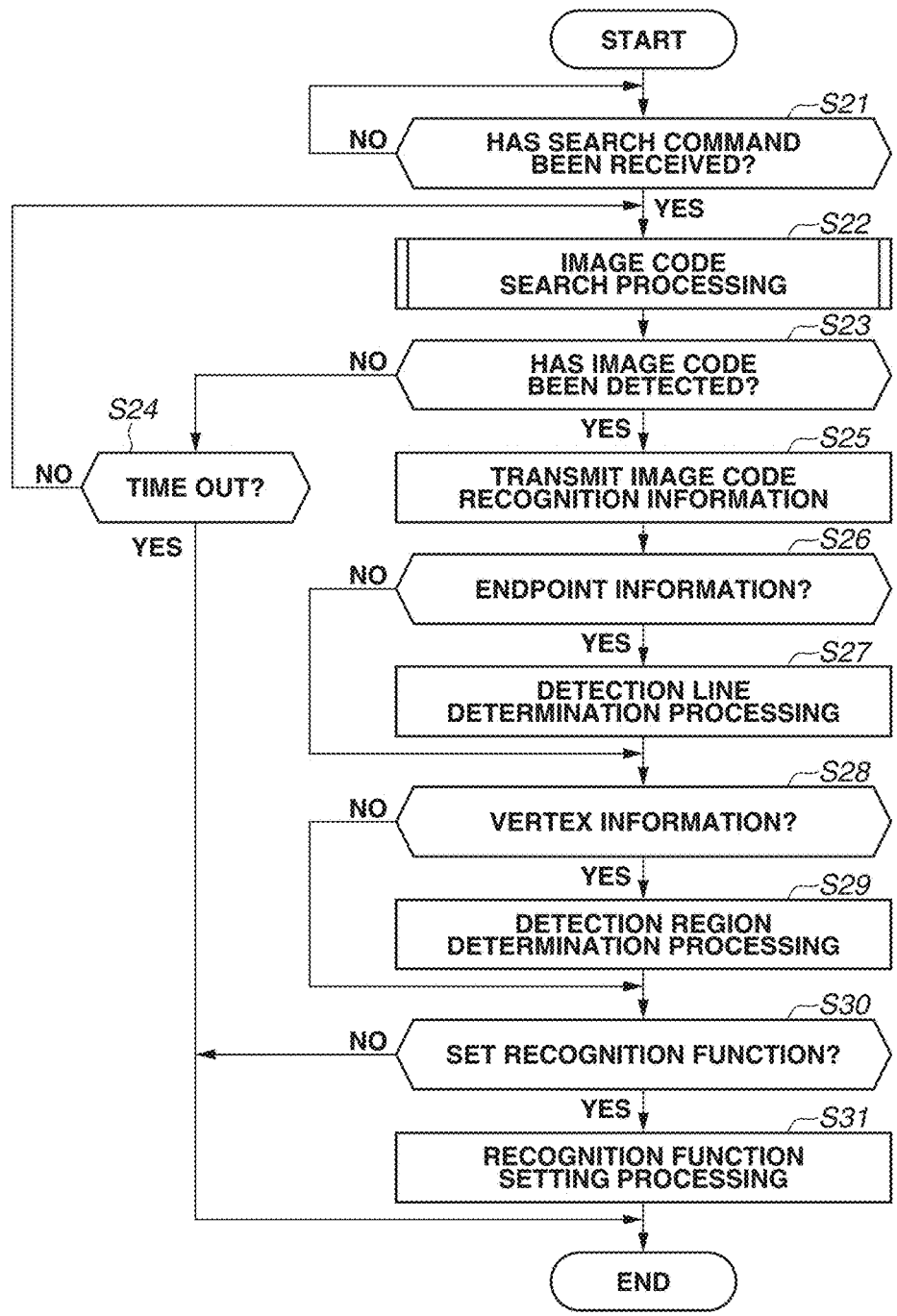
FIG. 7 is a flowchart illustrating network reception processing.

Next, an operation of the camera that has received the above-mentioned search command is described. In the following, an operation performed when the camera 10 has received the search command from the other camera is described with reference to FIG. 7. In the present exemplary embodiment, an example is mainly described in which the processing illustrated in FIG. 7 is performed by each element illustrated in FIG. 3 operating as an individual hardware component. However, a part of or the whole of the function of each element illustrated in FIG. 3 may be implemented by the CPU 101 of the camera 10.

First, in step S21, the CPU 101 determines whether the search command has been received via the network unit 21. If the CPU 101 determines that the search command has not been received (NO in step S21), the processing waits until the search command is received. If the CPU 101 determines that the search command has been received (YES in step S21), the processing proceeds to step S22. In step S22, the image code search unit 13 performs the above-described image code search processing illustrated in FIG. 6.

Then, in step S23, the CPU 101 determines whether an image code has been detected at the spatial position (a world coordinate point) included in the search command received in step S21 for the image code search processing. If the CPU 101 determines that no image code has been detected (NO in step S23), the processing proceeds to step S24. If the CPU 101 determines that an image code has been detected (YES in step S23), the processing proceeds to step S25. In step S24, the CPU 101 determines whether the image code search operation has timed out. If the CPU 101 determines that the image code search operation has not yet timed out (NO in step S24), the processing returns to step S22, in which the CPU 101 re-performs the image code search processing. On the other hand, if the CPU 101 determines that the image code search operation has timed out (YES in step S24), the processing directly ends.

In step S25, the other-camera setting unit 20 transmits, to the camera that transmitted the search command, image code recognition information indicating that an image code has been detected (recognized), via the network unit 21. In steps S26 to S31, the CPU 101 performs processing similar to that of steps S9 to S14 illustrated in FIG. 5 described above. Thus, the setting management unit 17 performs setting regarding image analysis processing based on setting information included in an image code received from a search command.

With the above-described configuration, a plurality of cameras 10 can monitor a monitoring target range at different angles (in different directions), different angles of view, or different zoom magnifications. Accordingly, for example, in a case where an intrusion detection function is enabled, any failure in detection of a person who has intruded into a predetermined detection region can be prevented or reduced, so that an improvement in tracking accuracy with respect to such a person can be expected.

Figure 8:
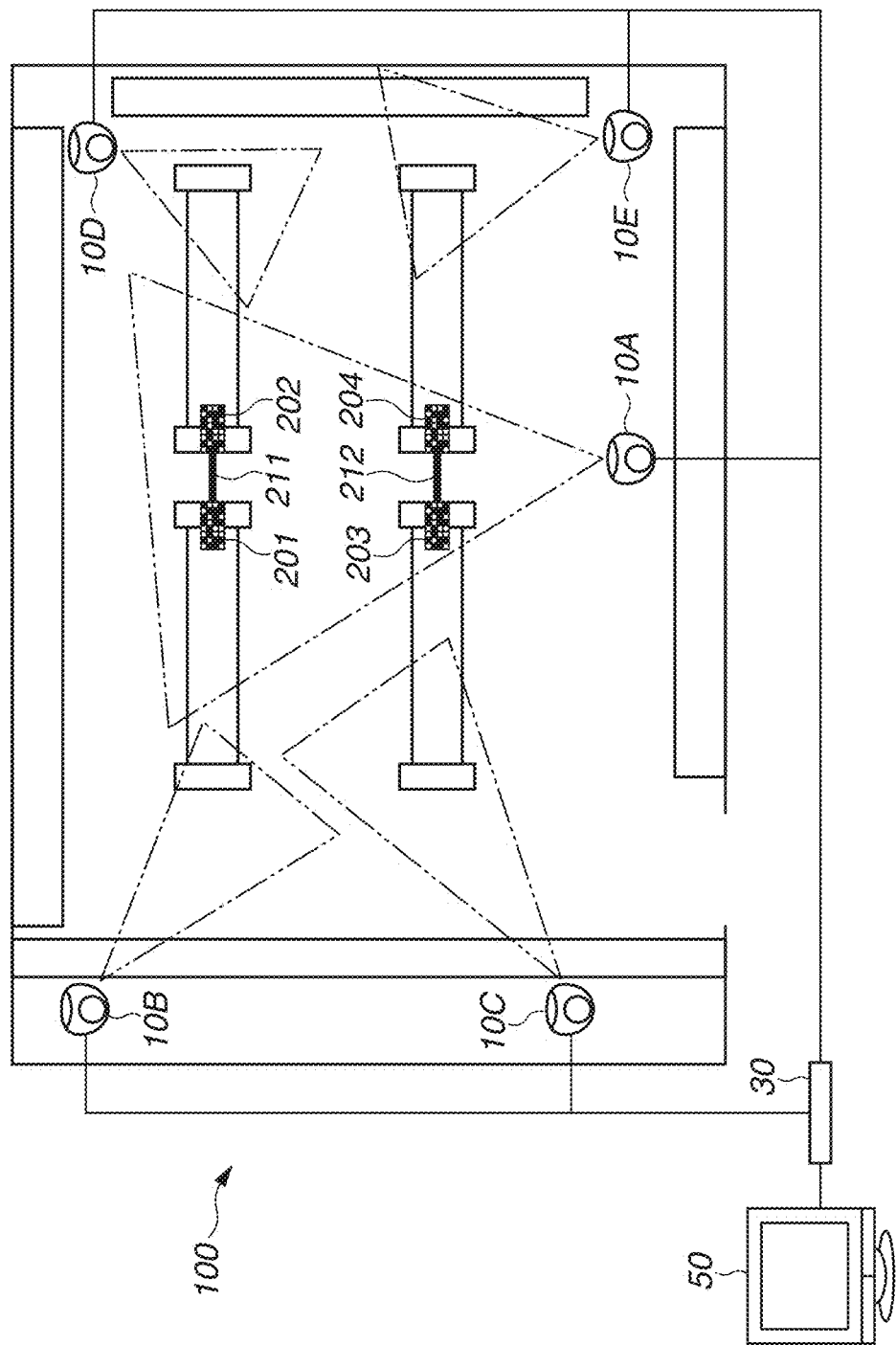
FIG. 8 illustrates an example of setting of a passage detection function.

Referring to FIG. 8, image codes 201 and 202 are color codes in which endpoint information indicating that they are endpoints of a common detection line is embedded as parameter setting information. The same is also applied to image codes 203 and 204. These image codes 201 to 204 are installed inside a store, which is an image capturing location, as illustrated in FIG. 8. When the camera 10A is started in the setting mode, the camera 10A starts camera setting processing.

First, the camera 10A performs image code search processing to detect the image codes 201 to 204. Then, the camera 10A calculates the spatial positions of the image codes 201 to 204, and reads out setting information embedded in the image codes 201 to 204. Since endpoint information is embedded in each image code, the camera 10A determines detection lines based on the endpoint information. At this time, the camera 10A determines a detection line 211 with the spatial position of the image code 201 and the spatial position of the image code 202 set as the respective endpoints. Moreover, the camera 10A determines a detection line 212 with the spatial position of the image code 203 and the spatial position of the image code 204 set as the respective endpoints. Then, the camera 10A starts a passage detection function in which the detection lines 211 and 212 are used as passage detection lines.

Figure 9:
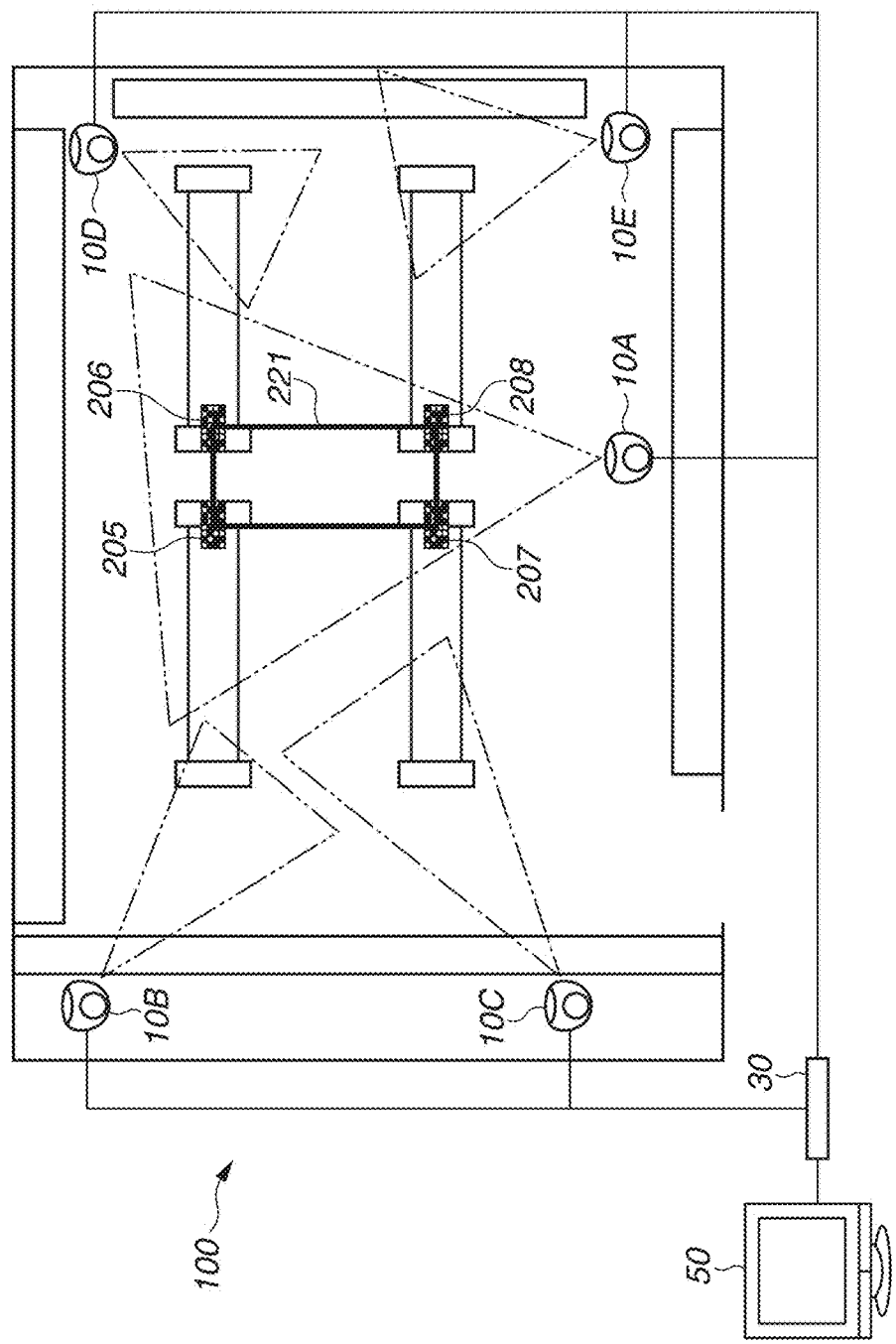
FIG. 9 illustrates an example of setting of an intrusion detection function.

Furthermore, referring to FIG. 9, image codes 205 to 208 are color codes in which vertex information indicating that they are vertices of a common detection region is embedded as parameter setting information. These image codes 205 to 208 are installed inside a store, which is an image capturing location, as illustrated in FIG. 9. When the camera 10A is started in the setting mode, the camera 10A starts camera setting processing.

First, the camera 10A performs image code search processing to detect the image codes 205 to 208. Then, the camera 10A calculates the spatial positions of the image codes 205 to 208, and reads out setting information embedded in the image codes 205 to 208. Since vertex information is embedded in each image code, the camera 10A determines a detection region based on the vertex information. At this time, the camera 10A determines a detection region 221 with the spatial positions of the image codes 205 to 208 set as the respective vertices. Then, the camera 10A starts an intrusion detection function in which the detection region 221 is used as an intrusion detection region.

As described above, according to the present exemplary embodiment, the camera 10 detects an image code from a captured image, and acquires setting information included in the image code. Then, the camera 10 performs setting regarding image analysis processing based on the acquired setting information.

The setting regarding image analysis processing as used herein is setting of parameters required for execution of the image analysis processing. Since the parameters are set based on parameter setting information for setting the parameters, which is embedded in an image code, the setting regarding image analysis processing can be easily performed.

In particular, parameters regarding positions on a real space, such as a monitoring target region, a detection line for passage detection of a moving object, and a detection region for intrusion detection of a moving object, can be set. Therefore, at the time of installation of the camera, the user does not need to perform an operation to draw a detection line or a frame of a detection region while viewing a camera video image displayed on a setting screen. In this way, the user can perform setting regarding image analysis processing without operating the camera while viewing the setting screen.

Furthermore, since information regarding endpoints of a virtual line segment or vertices of a virtual closed region that is set on a real space is embedded in an image code as parameter setting information, the parameters can be easily set.

For example, information indicating that the installation position of an image code is the endpoint position of a virtual line segment or the vertex position of a virtual closed region can be set as the parameter setting information. In this case, since the position of a real space of the image code is derived based on the position of the image code within a captured image and an image capturing condition of the camera 10 that has captured the captured image, parameters such as a detection line and a detection region can be set. In other words, directly installing an image code at a position corresponding to the real space position used for setting regarding image analysis processing enables easily and appropriately setting parameters regarding the positions.

In this way, locating an image code on a real space enables easily performing a setting operation, which would heretofore need to be performed on a setting screen of a management terminal or other external apparatus, without operating the setting screen. For example, image codes are respectively located at endpoint positions of a virtual line segment on the real space. Then, the real space position of each image code is derived based on the captured image of each image code and an image capturing condition. This enables easily determining a virtual line segment connecting two endpoints. Accordingly, if the determined virtual line segment is set as a detection line used for passage detection of a moving object, a passage detection function can be realized.

Furthermore, similarly, locating image codes at respective vertex positions of, for example, a rectangular virtual closed region on the real space enables easily determining a virtual closed region connecting four vertices. Accordingly, if the determined virtual closed region is set as a detection region used for intrusion detection of a moving object, an intrusion detection function can be realized. Furthermore, if the determined virtual closed region is set as a monitoring target region that is targeted by the camera 10, various status analysis functions can be realized. Moreover, an image code can be located at a monitoring target position on the real space and a predetermined region in which the monitoring target position is included can be set as a monitoring target region of the camera 10.

Furthermore, in a case where a monitoring target range of the camera 10 is set as setting regarding image analysis processing, an image capturing condition (for example, an image capturing direction or an angle of view) can be controlled in such a manner that the camera 10 captures an image of the monitoring target range. In this way, the user does not have to set a monitoring target range while checking a camera video image on the setting screen, the user does not need to perform a cumbersome and complicated setting operation.

Additionally, function setting information for specifying an image analysis function that is to be enabled among a plurality of image analysis functions can be set as setting regarding image analysis processing. This enables easily selecting image analysis processing that is to be performed. Accordingly, a desired image analysis function can be appropriately realized.

As described above, according to the present exemplary embodiment, since the user is enabled to set a camera function, a camera angle, or other setting item without viewing and operating a management screen at the time of installation of the camera 10, the user's convenience at the time of installation of the camera 10 can be enhanced.

(Modification Examples)

Furthermore, although, in the above-described exemplary embodiment, a ray intersection method in which a virtual floor surface of image data is set is used for calculation of a spatial position (a world coordinate point) at which an image code exists, this is not limiting. For example, an infrared light image can be captured using an infrared depth sensor and infrared light and a spatial position can be calculated from the infrared image and a visible light image. Moreover, a spatial position can also be calculated using a range image camera of the time-of-flight (TOF) type, which is separate from the camera 10.

Additionally, in the above-described exemplary embodiment, acquisition function setting for human face detection, face authentication, and human body trajectory information can be embedded in an image code.

Furthermore, although, in above-described exemplary embodiment, a detection region used for an intrusion detection function is made rectangular as illustrated in FIG. 9, this is not limiting. For example, a closed region having an arbitrary shape, such as an ellipse or circle, can be specified by an image code. Moreover, although a case in which the spatial position of an image code is the endpoint position of a detection line or the vertex position of a detection region has been described, spatial position information of an endpoint of the detection line or spatial position information of a vertex of the detection region can be directly embedded in an image code. In this case, since parameters such as a detection line or detection region can be set based on only setting information embedded in an image code, processing for deriving a spatial position of the image code becomes unnecessary.

Additionally, in above-described exemplary embodiment, an image code can be used to specify an object targeted for desertion or carry-away as another image analysis function.

Furthermore, in above-described exemplary embodiment, setting information regarding an autopilot function, which automatically moves the orientation (direction or angle of view) of the camera 10, can be used as setting information to embed in an image code.

Moreover, although, in above-described exemplary embodiment, a case in which a PTZ camera is used as the camera 10 has been described, this is not limiting and the following modification can be made. For example, a camera having a mechanism capable of performing only zoom or a camera used for fixed-point monitoring can be used to detect an image code within an image frame.

Additionally, in above-described exemplary embodiment, the respective camera angles of a plurality of cameras 10 can be adjusted in such a way as to cover a plurality of monitoring target portions. For example, image codes are respectively installed at a plurality of monitoring target portions and a plurality of cameras 10 concurrently performs search processing for image codes. Then, the plurality of cameras 10 performs mutual communications and exchanges information about the recognized image codes, and the orientation and image capturing range of each camera 10 are automatically set in such a manner that at least one of the plurality of cameras 10 can capture an image of each image code installed at the real space. This enables easily performing setting of a plurality of cameras.

According to a configuration of the present exemplary embodiment, setting regarding image analysis processing at the time of installation of an imaging apparatus, such as a monitoring camera, can be easily performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-076526 filed Apr. 3, 2015, which is hereby incorporated by reference herein in its entirety.

What is claimed is:

1. An image processing apparatus comprising:
   a detection unit configured to detect a predetermined image in a captured image;
   determination unit configured to determine, based on a position of the predetermined image detected by the detection unit, a position regarding setting of image analysis processing; and
   a setting unit configured to perform, based on the position determined by the determination unit, setting regarding the image analysis processing to be performed on an image of a monitoring target range, wherein the image analysis processing includes detection processing to detect an event, regarding an object different from the predetermined image, at the determined position.

2. The image processing apparatus according to claim 1, wherein the determination unit determines the position regarding the setting based on the position, on a real space, of the predetermined image.

3. The image processing apparatus according to claim 1, wherein the determination unit determines a position of an endpoint of a detection line segment used for passage detection of the object.

4. The image processing apparatus according to claim 1, wherein the determination unit determines a position of a vertex of a virtual closed region at which to perform detection of the object.

5. The image processing apparatus according to claim 1, further comprising:
   an obtainment unit configured to obtain the position, on a real space, of the predetermined image based on both a position, within the captured image, of the predetermined image and an image capturing condition of an imaging unit that captured the captured image,
   wherein the determination unit determines, based on the position obtained by the obtainment unit, the position regarding the setting.

6. The image processing apparatus according to claim 1, wherein the determination unit determines, based on respective positions of a plurality of predetermined images detected by the detection unit, a plurality of positions regarding the setting, and
   wherein the setting unit sets, based on the plurality of positions determined by the determination unit, a detection line segment used for passage detection of the object.

7. The image processing apparatus according to claim 1, wherein the determination unit determines, based on respective positions of a plurality of predetermined images detected by the detection unit, a plurality of positions regarding the setting, and
   wherein the setting unit sets, based on the plurality of positions determined by the determination unit, vertices of a virtual closed region used for intrusion detection of the object.

8. The image processing apparatus according to claim 1, wherein the setting unit sets, as the monitoring target range, a region including respective positions of a plurality of predetermined images detected by the detection unit.

9. The image processing apparatus according to claim 8, further comprising an imaging control unit configured to apply, to an imaging unit, an image capturing condition of the imaging unit for capturing the image of the monitoring target range set by the setting unit.

10. The image processing apparatus according to claim 1, wherein
the determination unit further determines, based on the predetermined image detected by the detection unit, a type of the image analysis processing, and
wherein the setting unit performs, based on the determined type of the image analysis processing and the determined position, setting regarding the image analysis processing.

11. The image processing apparatus according to claim 1, further comprising an image analysis unit configured to perform the image analysis processing based on the setting performed by the setting unit.

12. The image processing apparatus according to claim 1, wherein the image analysis processing includes detection processing to detect the event regarding a moving object.

13. The image processing apparatus according to claim 1, wherein the image analysis processing includes detection processing to detect the event regarding a human object.

14. The image processing apparatus according to claim 1, wherein the predetermined image is a one-dimensional image code or a two-dimensional image code.

15. An image processing system comprising:
an imaging apparatus, in communication with the image processing apparatus, including an imaging unit configured to capture a captured image; and
a display apparatus, in communication with the image processing apparatus, wherein
the image processing apparatus comprises:
an acquisition unit configured to acquire setting information regarding setting of image analysis processing from the captured image;
a setting unit configured to perform, based on the setting information acquired by the acquisition unit, setting regarding the image analysis processing to be performed on a captured image of a monitoring target range; and
an image analysis unit configured to perform the image analysis processing based on the setting performed by the setting unit, and wherein
the display apparatus is configured to display a result of the image analysis processing performed by the image analysis unit.

16. An image processing method comprising:
detecting by a detection unit, a predetermined image in a captured image;
determining by a determination unit, based on a position of the predetermined image detected by the detection unit, a position regarding setting of image analysis processing; and
performing by a setting unit, based on the position determined by the determination unit, setting regarding the image analysis processing to be performed on an image of a monitoring target range, wherein the image analysis processing includes detection processing to detect an event, regarding an object different from the predetermined image, at the determined position.

17. A non-transitory computer-readable storage medium storing computer executable instructions that cause a computer to perform a method comprising:
detecting by a detection unit, a predetermined image in a captured image;
determining by a determination unit, based on a position of the predetermined image detected by the detection unit, a position regarding setting of image analysis processing; and
performing by a setting unit, based on the position determined by the determination unit, setting regarding the image analysis processing to be performed on an image of a monitoring target range, wherein the image analysis processing includes detection processing to detect an event, regarding an object different from the predetermined image, at the determined position.

* * * * *